United States Patent
Fossum et al.

(10) Patent No.: US 7,370,231 B2
(45) Date of Patent: May 6, 2008

(54) METHOD OF HANDLING ERRORS

(75) Inventors: Tryggve Fossum, Northborough, MA (US); Yaron Shragai, Waltham, MA (US); Shubhendu S. Mukherjee, Framingham, MA (US)

(73) Assignee: Intel Corporation, Santa Clara, CA (US)

(*) Notice: Subject to any disclaimer, the term of this patent is extended or adjusted under 35 U.S.C. 154(b) by 548 days.

(21) Appl. No.: 11/012,979

(22) Filed: Dec. 14, 2004

(65) Prior Publication Data
US 2006/0156153 A1    Jul. 13, 2006

(51) Int. Cl.
*G06F 11/00* (2006.01)
(52) U.S. Cl. ....................................................... 714/10
(58) Field of Classification Search .................. 714/10, 714/25, 39, 48; 712/226, 227
See application file for complete search history.

(56) References Cited

U.S. PATENT DOCUMENTS

| | | | |
|---|---|---|---|
| 4,438,494 A * | 3/1984 | Budde et al. .................. 714/2 |
| 6,691,250 B1 * | 2/2004 | Chandiramani et al. ...... 714/25 |
| 2003/0033562 A1 * | 2/2003 | Von Wendorff .............. 714/42 |
| 2003/0074601 A1 * | 4/2003 | Schultz et al. ................ 714/15 |
| 2005/0283712 A1 * | 12/2005 | Mukherjee et al. ......... 714/764 |
| 2006/0075300 A1 * | 4/2006 | Mukherjee ................... 714/38 |

FOREIGN PATENT DOCUMENTS

EP    0473806 A1    3/1990

OTHER PUBLICATIONS

Crouzet et al., "A 6800 Coprocessor For Error Detection in Microcomputers: The PAD" XP-000756011, Proceedings of the IEEE, vol. 74, No. 5, May 1986, pp. 723-731.

* cited by examiner

*Primary Examiner*—Nadeem Iqbal
(74) *Attorney, Agent, or Firm*—Thomas R. Lane

(57) ABSTRACT

An error handling routine of a processor, executing in response to a first detected unrecoverable error (DUE) of the processor, responding to an indication that a second DUE has occurred by evaluating the effect of the second DUE on the correctness of the error handling routine.

24 Claims, 3 Drawing Sheets

METHOD OF HANDLING ERRORS

BACKGROUND

Energetic subatomic particles such as neutrons from cosmic rays and alpha particles from radioactive trace components in the packaging of a semiconductor device may generate electron-hole pairs as they pass through such a device. Transistor source and drain terminals in the device may collect these charges and eventually a sufficient accumulation of charge may cause a logic device incorporating such a transistor to invert state or flip, introducing a logic fault into the circuit's operation. These faults are transient, because they are not a permanent failure of the device, and are therefore termed soft or transient errors. A common form of soft error is an error in a transistor that forms part of a memory cell such as a cache cell or register cell, causing a bit represented by such a cell to be flipped from its intended value.

The likelihood of a soft error affecting a processor or other semiconductor device depends on the number of on-chip transistors. In the case of processors, particularly, the number of on-chip transistors has grown very rapidly and therefore the error rate due to soft errors has grown in proportion. Therefore the importance of reducing the impact of soft errors on processor operation has increased in importance.

FIG. 1 illustrates a classification of soft errors in a processor memory unit such as a register or cache, depicted as a flowchart for clarity. When a soft error occurs, 110, the fault may be considered benign if the affected bit has not been read, 120 and 140. If the bit was read, but the affected unit, such as a cache line or register bank, has error protection built in, 130, the error may be recoverable or at least, detectable. Such error correction is well known and includes for example, parity and ECC schemes. In the situation where a bit does not have error protection, and the bit affects the correctness of any computation underway in the processor, a silent data corruption 180 is said to have occurred. This is an undesirable state that processor designers attempt to minimize in terms of its likelihood.

If the error is detected and can be corrected, 150, then the bit is set or reset to its original value and processor operation continues normally, 190. If the error cannot be corrected, but has been detected, the processor may take additional action because such an error is considered unrecoverable, 170. This type of error is termed a detected unrecoverable error or DUE.

Generally, a DUE results in an error-caused termination of at least the executing process which attempted to read the erroneous bit and sometimes an error-caused termination of the entire operating system running on the processor causing a machine halt or restart. It is, of course, preferable to terminate one process as opposed to the entire system so as to minimize the overall impact of the DUE. In highly reliable systems such as critical use servers, designers attempt to ensure that the mean time between system-terminating DUEs is very high, e.g., 25 years.

When a DUE is detected, the processor generally enters a software error handling routine. Using register error logs, the routine determines whether the DUE warrants a process or a system termination and how to proceed. In one scenario, a second DUE may occur during the execution of the error handling routine for a first DUE. While such an occurrence is relatively unlikely, a designer of a high reliability processor may need to consider this scenario.

DETAILED DESCRIPTION

Figure 1:
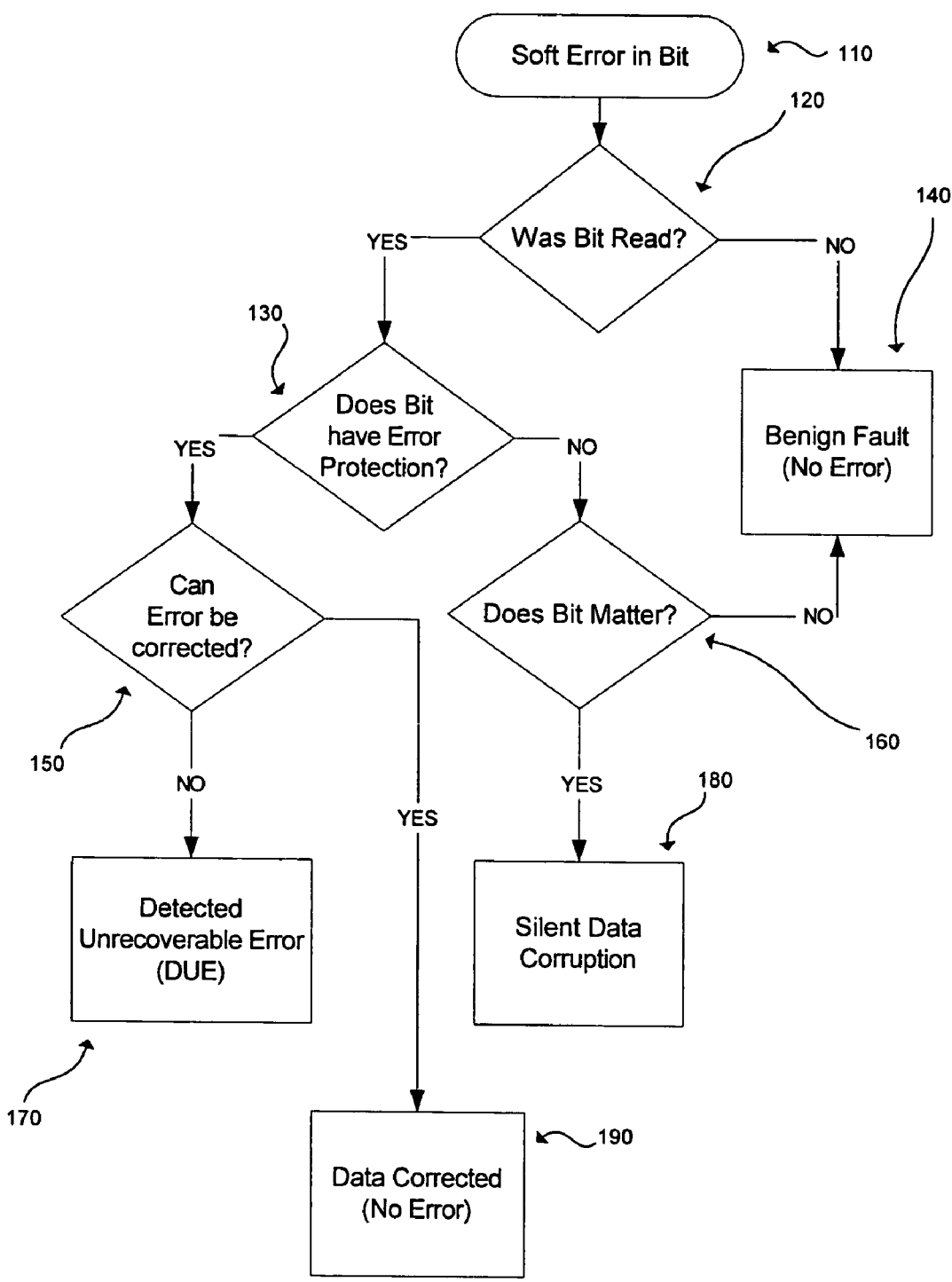
FIG. 1 depicts the effects of soft errors and various outcomes depending on detection, impact, and mitigation as a flowchart (Prior Art).
Figure 2:
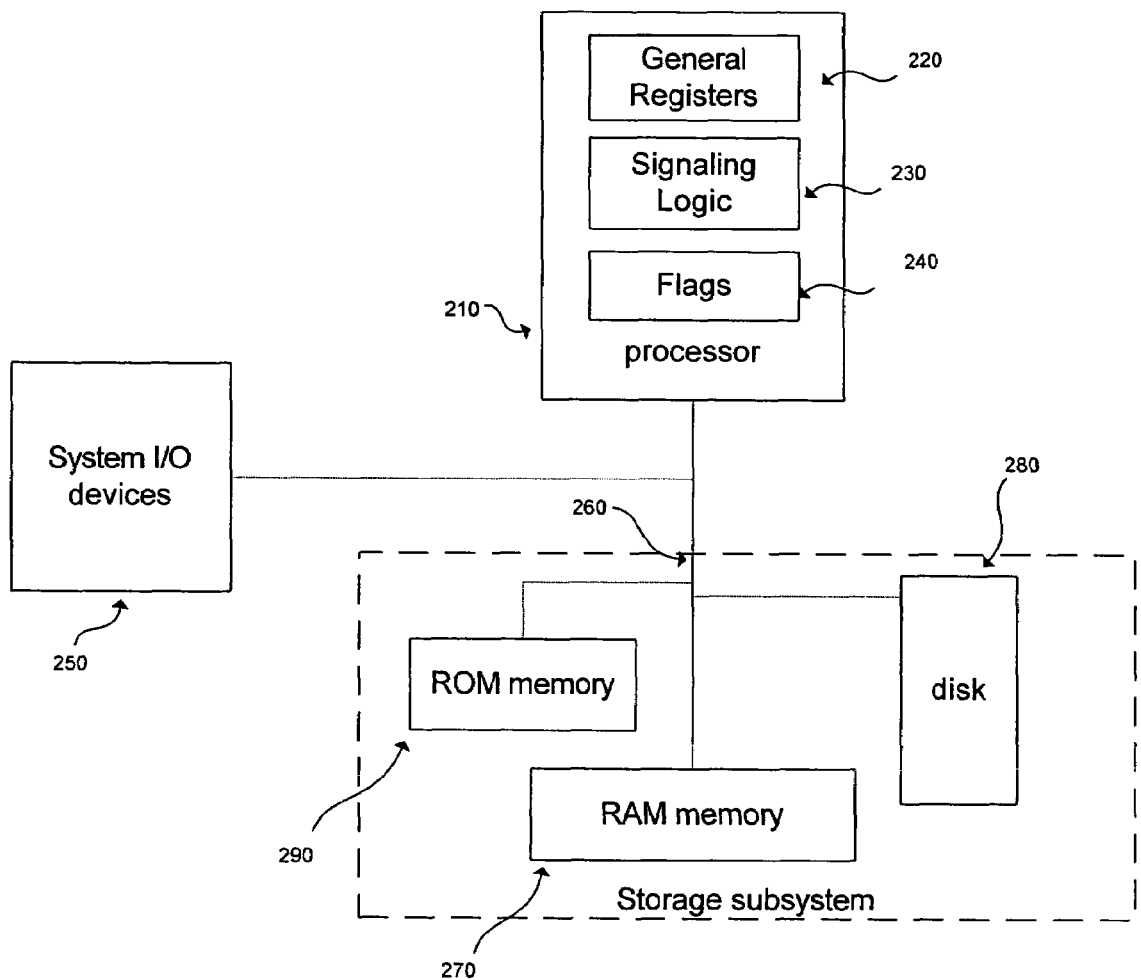
FIG. 2 depicts a processor-based system in one embodiment.

FIG. 2 depicts a processor-based system in one embodiment. Such a system includes a processor 210, a storage subsystem including a read-write random access memory (RAM memory) 270 and a read only memory (ROM memory) 290 to store data and programs executable by the processor, and a non-volatile storage unit such as a disk system 280, interconnected by a bus system 260, and interfacing with the external network or users through system input/output (I/O) devices and peripherals 250. The processor may include a set of general registers 220 for processes executing on the processor to store frequently used data; a set of status flags or bits indicating status of various aspects of processor operation 240; and signaling logic 230 that allows interaction between the status flags. As is known, many other components such as a cache, logic units, pipelines, etc. are also present as components of a processor and similarly other components may be present in a processor-based system, but are not depicted here in the interest of clarity.

When a processor such as that depicted in FIG. 2 detects a detectable unrecoverable error or DUE, typically by operation of an error detection mechanism such as parity checking or ECC, it generally interrupts the currently executing process and initiates execution of a software error handling routine. In one embodiment, the error handling routine is designed to be minimally susceptible to a second or subsequent DUE that may occur during the execution of the error handling routine itself. For example, the routine may execute with the cache turned off, so as not to expose itself to possible errors in cache memory. It may be stored in ROM 290 which is less susceptible to DUEs than RAM cells in a cache or system memory. Even if the routine does need to use RAM cells such as those in cache or a register, it may flush the contents of the area used for storage before modifying it. In general, however, it is very difficult for an error handling routine to execute without reading some memory cells susceptible to DUEs, whether registers, cache, or system memory, and therefore the possibility remains, even if small, that a DUE affecting the correctness of the routine may occur during its execution between the time the routine writes to a memory cell and the time at which it reads from the memory cell. In particular, it is very likely that an error handler will at some point in its execution need to write and then read at least some of the processor's general-purpose registers (general registers 220) in order to perform its task.

If a second DUE is detected before the first DUE is handled, it may or may not have occurred after error handler activation, because many memory reads that are unrelated to the error handler may take place between the time a first DUE is reported and the time the error handler is actually activated. Determining whether the DUE occurred before or after the routine was activated is useful in order to limit the need to generate a system termination which would be necessary if the DUE had indeed occurred after the routine's activation, because this could imply the possible corruption of the routine itself.

Figure 3:
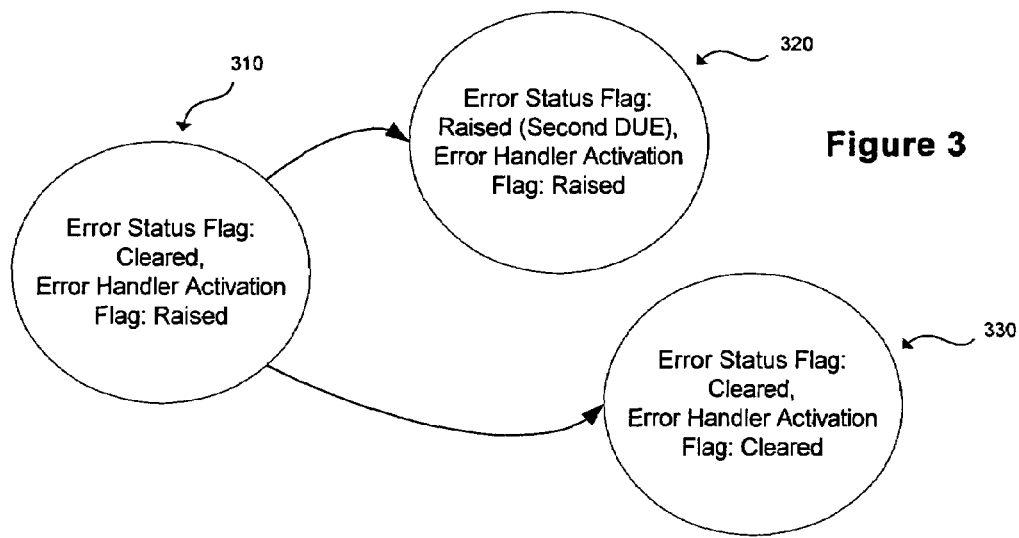
FIG. 3 is a state diagram of the possible states following the activation of an error handling routine in response to a first DUE in one embodiment.

FIG. 3 depicts the possible states of the system in relation to this issue. When the error handler begins, the error handler or its invocation mechanism typically clears the error status flag as soon as it begins executing. Furthermore, a flag may be set in some embodiments to indicate that the error handler is active. This state, where the error status flag is cleared, and the handler activation flag is raised, is shown at 310. From this state, the processor may move to one of two possible states with respect to the error handler activation status and the error status. In one alternative, the error handler terminates without another DUE occurring (error status flag is still cleared, and handler activation flag is also cleared, 330) and a process termination can be used to handle the first DUE. In another alternative, a state occurs in which the error handler is active while the error status flag is raised, indicating a second DUE, at 320. This state may indicate an error in the execution of the DUE, and without more information, the conservative approach for handling the error when this state is detected is to cause a system termination.

In one embodiment, signaling logic 230, discussed above with reference to FIG. 2, is used to detect the state 320 shown in FIG. 3. For example, in the Intel® Itanium processor, a condition in which the PSR.mc bit, indicating activation of the "machine check" (mc) error handling routine and the concurrent raising of a flag in the hardware general register error log while the PSR.mc flag is raised, could be detected by signaling logic to indicate a state in which the correctness of the machine check routine was possibly compromised.

While the solution described above would work, it may over-include situations in which the second DUE did not affect the error handler but only the interrupted process. In one embodiment, the error handling routine saves at least some of the general registers to a temporary memory area before using them. If a DUE is reported that affects a general register during execution of the routine, determining whether the DUE occurred before or after the routine began to use the general registers is useful in order to limit the need to generate a system termination to a situation in which the general register was affected only after the routine began to use the register.

Figure 4:
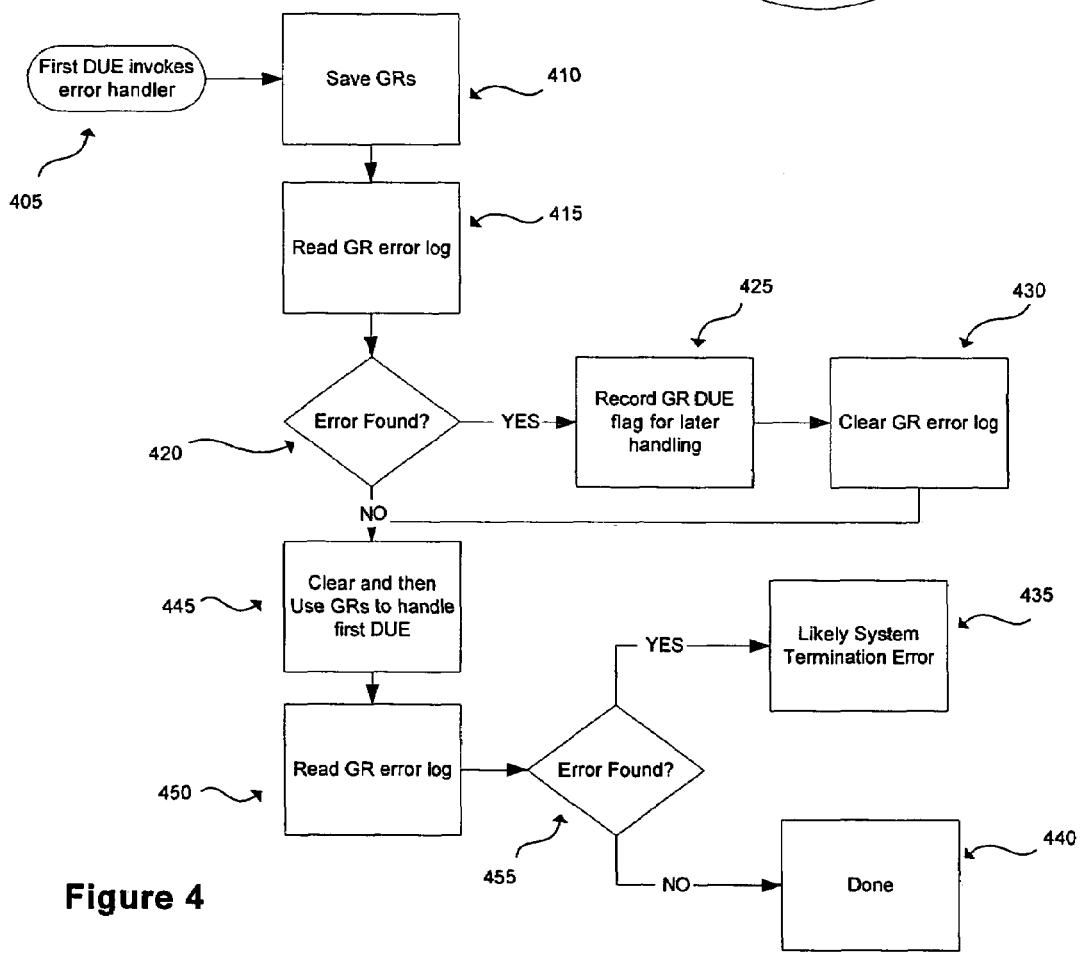
FIG. 4 is a flowchart of software based solution to mitigate the effects of a second DUE occurring during error handling of a first DUE in one embodiment.

FIG. 4 depicts processing within an error handling routine designed to detect a second DUE error that has occurred after the DUE error that is currently being handled, and further to determine whether that error is likely to affect the execution of the routine. In the figure, the routine begins after being invoked in response to a first DUE 405 with a step that saves any general registers (GRs) that may be used by it, 410. The routine then checks the general register hardware error log, 415, to see if any DUEs were flagged by the hardware following the first DUE. If the hardware indicates that a DUE was flagged, 420, it is a DUE that affects the interrupted process. The routine stores the general register DUE information for later handling 425, clears the GR error log 430, and then clears and uses the general registers, 445. After using the general registers, and completing handling of the first DUE, the routine then checks the general register error log again, 450. If an error is found at this state, 455, it is very likely that an error compromising the correctness of the error handling routine has occurred and a system termination process may be initiated, 435. Otherwise, the handler may then terminate normally 440.

While certain exemplary embodiments have been described above and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It may be possible to implement the embodiments or some of their features in hardware, programmable devices, firmware, software or a combination thereof.

Embodiments may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions.

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A method comprising:
    in an error handling routine of a processor, executing in response to a first detected unrecoverable error (DUE) of the processor, responding to an indication that a second DUE has occurred by evaluating one or more effects of the second DUE on the correctness of the error handling routine;
    the error handling routine saving the contents of a set of general purpose registers of the processor to temporary storage;
    after saving the contents of the set of general purpose registers, the error handling routine clearing a general register error log that is to record a DUE in the general purpose registers.

2. The method of claim 1 further comprising determining whether the second DUE occurred in a resource used by the error handling routine; and whether the indication that the second DUE had occurred was made before termination of the error handling routine.

3. The method of claim 2 wherein the indication indicating the second DUE had occurred in a resource used by the error handling routine comprises a raised error status flag of the processor.

4. The method of claim 3 further comprising detecting a state in which the error status flag of the processor and a flag indicating activation of the error handling routine are both raised.

5. The method of claim 4 wherein the resource used by the error handling routine comprises one of the set of general purpose registers.

6. The method of claim 1 further comprising raising a system termination exception if the evaluation determines that the second DUE has had an effect on the correctness of the error handling routing and raising a process termination exception otherwise.

7. The method of claim 4 further comprising raising a system termination exception if a state in which the error status flag of the processor and a flag indicating activation of the error handling routine are both raised is detected and raising a process termination exception otherwise.

8. The method of claim 1 further comprising raising a system termination exception if a general register error flag is raised during the remaining operation of the error handling routine and raising a process termination exception otherwise.

9. A processor comprising:
a set of general purpose registers;
an error detection system to detect a first detected unrecoverable error (DUE) in a resource of the processor; and
logic to execute an error handling routine in response to the first DUE and to respond to an indication from the error detection system that a second DUE has occurred by evaluating the effect of the second DUE on the correctness of the error handling routine, wherein the error handling routine is to save the contents of the set of general purpose registers to temporary storage and, after saving the contents of the set of general purpose registers, to clear a general register error log that is to record a DUE in the general purpose registers.

10. The processor of claim 9 wherein the error handling routine is further to determine
whether the second DUE occurred in a processor resource used by the error handling routine; and
whether the indication that the second DUE had occurred was made before termination of the error handling routine.

11. The processor of claim 10 wherein
the indication indicating the second DUE had occurred in a resource used by the error handling routine comprises a raised error status flag of the processor.

12. The processor of claim 11 further comprising logic to detect a state in which the error status flag of the processor and a flag indicating activation of the error handling routine are both raised.

13. The processor of claim 9 wherein the resource used by the error handling routine comprises one of the set of general purpose registers.

14. The processor of claim 9 wherein the error handling routine is further to raise a system termination exception if the evaluation determines that the second DUE has had an effect on the correctness of the error handling routine and raising a process termination exception otherwise.

15. The processor of claim 12 wherein the error handling routine is further to raise a system termination exception if a state in which the error status flag of the processor and a flag indicating activation of the error handling routine are both raised is detected and to raise a process termination exception otherwise.

16. The processor of claim 9 further comprising logic to raise a system termination exception if a general register error flag is raised during the remaining operation of the error handling routine and to raise a process termination exception otherwise.

17. A machine readable storage medium having stored thereon data which when accessed by a machine causes the machine to perform a method, the method comprising:
an error handling routine of a processor, executing in response to a first detected unrecoverable error (DUE) of the processor, responding to an indication that a second DUE has occurred by evaluating the effect of the second DUE on the correctness of the error handling routine;
the error handling routine saving the contents of a set of general purpose registers of the procestor to temporary storage;
after saving the contents of the set of general purpose registers, the error handling routine clearing a general register error log that is to record a DUE in the general purpose registers.

18. The machine readable storage medium of claim 17 wherein the method further comprises raising a system termination exception if a general register error flag is raised during the remaining operation of the error handling routine and raising a process termination exception otherwise.

19. A system comprising a processor, the processor comprising:
a set of general purpose registers;
an error detection system to detect a first detected unrecoverable error (DUE) in a resource of the processor; and
logic to execute an error handling routine in response to the first DUE and to respond to an indication from the error detection system that a second DUE has occurred by evaluating the effect of the second DUE on the correctness of the error handling routine, wherein the error handling routine is to save the contents of the set of general purpose registers to temporary storage and, after saving the contents of the set of general purpose registers, to clear a general register error log that is to record a DUE in the general purpose registers.

20. The system of claim 19 wherein the error handling routine is further to determine
whether the second DUE occurred in a processor resource used by the error handling routine; and
whether the indication that the second DUE had occurred was made before the termination of the error handling routine.

21. The system of claim 20 wherein
the indication indicating the second DUE had occurred in a resource used by the error handling routine comprises a raised error status flag of the processor.

22. The system of claim 21 wherein the processor further comprises logic to detect a state in which the error status flag of the processor and a flag indicating activation of the error handling routine are both raised.

23. The system of claim 22 wherein the resource used by the error handling routine is one of the general purpose registers.

24. The processor of claim 22 wherein the error handling routine is further to raise a system termination exception if a state in which the error status flag of the processor and a flag indicating activation of the error handling routine are both raised is detected and to raise a process termination exception otherwise.

* * * * *